(No Model.) 2 Sheets—Sheet 1.

D. TUFTS.
WIRE CABLE.

No. 406,068. Patented July 2, 1889.

Witnesses:

Inventor,
David Tufts
By James J. Ray
Attorney (No Model.) 2 Sheets—Sheet 2.

D. TUFTS.
WIRE CABLE.

No. 406,068. Patented July 2, 1889.

Witnesses:
J. N. Cooke
Robt. D. Totten

Inventor,
David Tufts
By James J. Ray
Attorney

UNITED STATES PATENT OFFICE.

DAVID TUFTS, OF PITTSBURG, PENNSYLVANIA.

WIRE CABLE.

SPECIFICATION forming part of Letters Patent No. 406,068, dated July 2, 1889.

Application filed March 28, 1889. Serial No. 305,149. (No model.)

*To all whom it may concern:*

Be it known that I, DAVID TUFTS, a resident of Pittsburg, in the county of Allegheny and State of Pennsylvania, have invented a new and useful Improvement in Wire Cables; and I do hereby declare the following to be a full, clear, and exact description thereof.

My invention relates to wire rope or cable, and has special reference to the cable employed for draft purposes, such as the cable employed for wire carriers or for cable railroads. These cables are driven overhead or in suitable underground conduits, and the cars or carriers are secured thereto by suitable gripping devices, and as the cable travels continuously the cars or carriers are drawn or carried through the connection made by the gripping devices. It is found, however, especially in connection with cable roads, that as the wire cables are generally heavily lubricated, and as they are required to draw heavy loads—such as in the case of a well-loaded car—the gripping devices are liable to slip upon the cable, and for that reason there is difficulty in carrying the load. As the rope is of practically the same diameter throughout, if the gripping device does not bind with sufficient tightness and the car is heavily loaded, the cable may slip through the gripping device, so that it is not able to hold with sufficient firmness to the cable, and this action creates great friction between the gripping device and the cable, and heavy wear on both.

The object of my invention is to provide a traction device for cable and like roads in which these difficulties are overcome; and it consists, essentially, in the combination, with a gripping device, of a traction-cable whose diameter is made to enlarge and diminish at recurring intervals in its length, so that the gripping device may be closed upon the body of the rope or cable, and in case it does not hold with sufficient firmness thereto and the rope slips through the same the enlargement in the rope will come against the gripping device, so giving a thicker body for it to catch and hold upon, and therefore a firm hold may be obtained upon the cable, sufficient to carry even a very heavy load.

To enable others skilled in the art to make and use my invention, I will describe the same more fully, referring to the accompanying drawings, in which—

Figure 1:
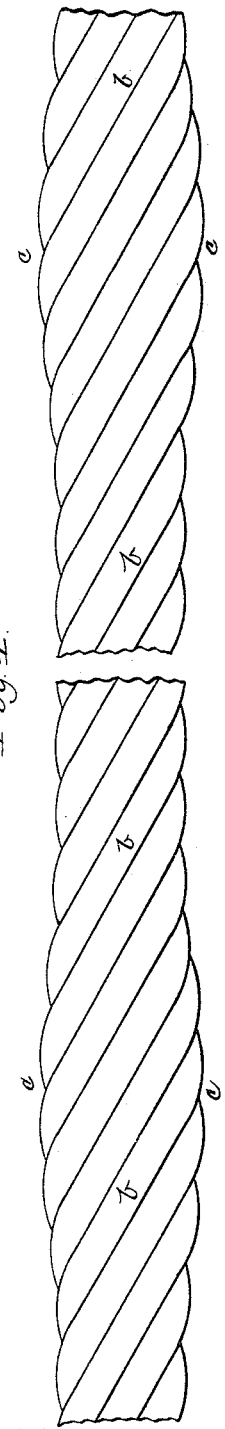
Figure 2:
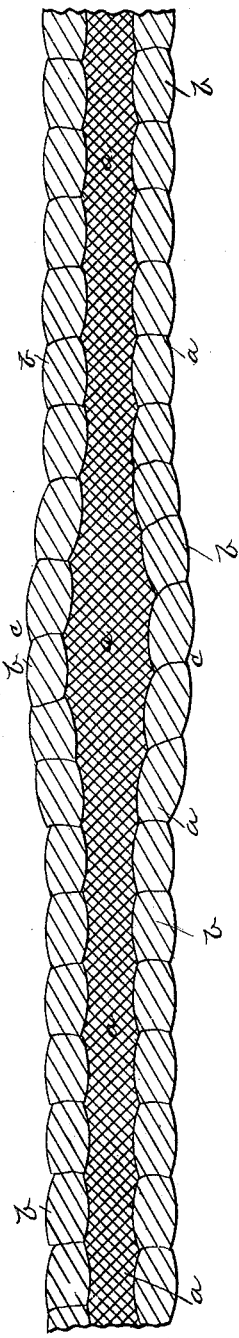
Figure 3:
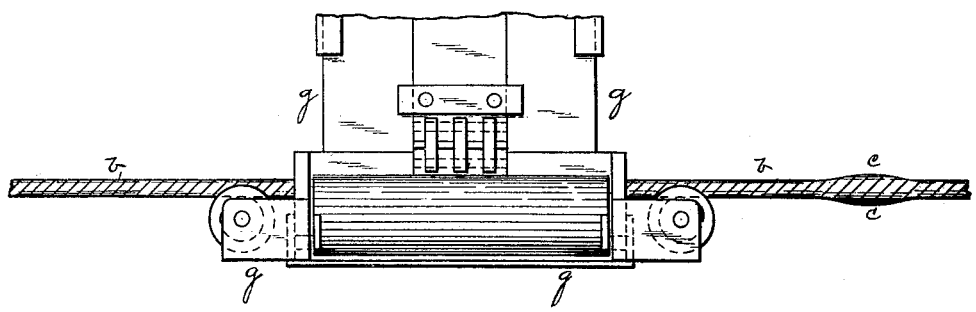
Figure 4:
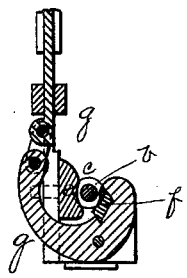

Figure 1 is a side view of the rope employed by me. Fig. 2 is a longitudinal central section of the same; and Fig. 3 is a side view of a gripping device, and Fig. 4 a vertical transverse section of a gripping device engaging with the rope.

Like letters of reference indicate like parts in each.

The wire rope employed is preferably formed of a central strand $a$ and a series of surrounding strands $b$, wound spirally around it, as is the usual construction in such ropes, and at intervals in the body of the rope are formed enlarged portions $c$, these enlarged portions being formed any suitable number of feet apart, as is found best for the purpose, and the enlargements being made of any suitable diameter relative to the diameter of the main body of the rope as may be desired—such for example, where the rope is formed one inch in diameter, the enlargements may be formed from an inch and an eighth ($1\frac{1}{8}$) to one inch and a quarter ($1\frac{1}{4}$) in diameter—so providing enlarged portions of greater diameter than the space between the faces $e\ f$ of the gripping device $g$ when it is closed; and in case the main body of the rope should slip through the gripping device one of the enlargements will then come in contact with the gripping device, and on account of the greater thickness will give a body against which the gripping device may hold firmly, so insuring a firm hold upon the rope and enabling it to carry the load. As the enlargement is formed in the body of the rope, it gradually increases and decreases in thickness at the ends thereof, so that there is no part or shoulder which might strike against and break the gripping device, which simply travels up the inclined portions of the enlargement and binds firmly thereon, the enlarged portion so wedging within the gripping device and giving it the firm hold desired.

In forming the enlargements upon the body of the rope I generally form enlargements in the central strand $a$, as is shown in Fig. 2. This strand in the most approved wire rope is formed of hemp or manila, and the enlargements can be easily formed by increasing the thickness of the central strand at the proper intervals by the wrapping of manila around or the weaving of manila in with that portion of the strand, or increasing the thickness at that point in other ways, forming the enlargements as shown at c. Some other material may of course be used for the central strand—such as wire—and the enlargements be formed in such wire by the wrapping of wire or other materials around that portion, or such wire or other material may be wrapped around the manila central strand, so as to form the proper enlarged portions. The strands b, forming the outer body of the rope, can then be wound spirally around the central strand, and on account of the enlargements above referred to will form the necessary enlarged portions c at intervals on the rope, as shown in the figures of the drawings, and in this way I am enabled to obtain the enlargements and at the same time have the continuous outer strands, as is usual and necessary in wire ropes.

By combining with the gripping device the rope having the enlargements thereon, as above set forth, I am thus enabled to give a greater hold upon the cable and prevent the slipping of the cable through the grip, and at the same time provide for the easy running of the cable over the pulleys or supports, as in practically all cases the enlargements will not be too thick to run easily within the grooves of such supports.

What I claim as my invention, and desire to secure by Letters Patent, is—

In traction apparatus, the combination of a gripping device and a traction-cable whose diameter is made to enlarge and diminish at recurring intervals in its length, substantially as and for the purposes set forth.

In testimony whereof I, the said DAVID TUFTS, have hereunto set my hand.

DAVID TUFTS.

Witnesses:
J. N. COOKE,
ROBT. D. TOTTEN.